United States Patent
Ouvry et al.

(10) Patent No.: US 6,444,347 B1
(45) Date of Patent: Sep. 3, 2002

(54) GAS DIFFUSION ELECTRODE AND APPLICATION TO CATALYZED ELECTROCHEMICAL PROCESSES

(75) Inventors: Ludovic Ouvry; Nathalie Nicolaus, both of Lyon; Philippe Parmentier, Villeurbanne, all of (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 09/623,206

(22) PCT Filed: Dec. 30, 1999

(86) PCT No.: PCT/FR99/03316

§ 371 (c)(1),
(2), (4) Date: Aug. 29, 2000

(87) PCT Pub. No.: WO00/41251

PCT Pub. Date: Jul. 13, 2000

(30) Foreign Application Priority Data

Dec. 30, 1998 (FR) .............................................. 98 16630

(51) Int. Cl.[7] ................................................ H01M 4/86
(52) U.S. Cl. ............................ 429/44; 429/429; 429/42; 429/41; 429/40; 204/283
(58) Field of Search ............................... 429/40, 41, 42, 429/44; 204/283

(56) References Cited

U.S. PATENT DOCUMENTS 5,395,705 A    3/1995   Door et al. .................... 429/42

FOREIGN PATENT DOCUMENTS

| FR | 2 318 680 | 2/1977 |
|----|-----------|--------|
| FR | 2318680   | 2/1977 |
| JP | 52070121  | 6/1977 |
| JP | 62154461  | 7/1987 |
| JP | 1014873   | 1/1989 |
| WO | WO98/41678 | 9/1998 |
| WO | WO 99 26721 | 6/1999 |
| WO | WO99/26721 | 6/1999 |

OTHER PUBLICATIONS

T. Yamamoto et al. "Electrochemical reduction of CO2 in micropores", Studies in Surface Science and Catalysis vol. 114, 1998 p. 585–588, No month available.

P.P. Andonoglou et al. "Preparation and electrocatalytic activity of rhodium modified pitch–based carbon fiber electrodes" Electrochimica Acta vol. 44 No. 8–9, Dec. 1, 1998, p. 1455–1465.

J.H. Liew et al. "Cathode Performance of AFC/acetylene black hybrid electrodes for Phosphoric Acid Fuel Cell" TANSO, No. 155, 1992, pp. 407–410 No month available.

David R Lowde et a. "Characterization of Elector–oxication Catalysts Prepared by Ion–exchange of Platinum Salts with Surface Oxide Groups on Carbon" Journal of Chemical Society vol. 75, No. 10 1979 p. 2312–2324. No month available.

(List continued on next page.)

*Primary Examiner*—Bruce F. Bell
(74) *Attorney, Agent, or Firm*—Weingarten, Schurgin, Gagnebin & Lebovici LLP

(57) ABSTRACT

A gas diffusion electrode comprises a cloth (12) of activated carbon fibers having a first face coated in a hydrophobic material (14) and a second face on which particles of catalyst (16) are fixed directly and are dispersed in substantially uniform manner over the fibers. The electrode can be used in an electrochemical cell of a proton exchange membrane fuel-cell battery, or in an electrochemical reactor, e.g. for making chlorine and caustic soda.

32 Claims, 4 Drawing Sheets

OTHER PUBLICATIONS

J–H Liew, Y–G Shul, T–H Lee, S–K Ryu, B–S Rhee, "Cathode performance of AFC/acetylene black hybrid electrodes for phosphoric acid fuel cell" TANSO, No. 155, 1992, p. 407–410** No month available.

T. Yamamoto, D.A. Tryk, K. Hashimoto, A. Fijishima, M. Okawa, "Electrochemical of CO2 in micropores" Studies in Surface Science and Catalysis, vol. 114, 1998, pp. 585–588** No month available.

Andonoglou P P et al., "Preparation and electrocatalytic actiity of rhodium modified pitch–based carbon fiber electrodes" Electrochimica Acta, vol. 44, No. 8–9, Dec. 1, 1998 p. 1455–1465** No month available.

GAS DIFFUSION ELECTRODE AND APPLICATION TO CATALYZED ELECTROCHEMICAL PROCESSES

FIELD OF THE INVENTION

The invention relates to gas diffusion electrodes used in catalyzed electrochemical processes. Fields of application are fuel cells of the proton-exchange membrane type and electrochemical reactors, e.g. or making chlorine/caustic soda. The invention also relates to a method of making such electrodes.

BACKGROUND OF THE INVENTION

An electrode of the type used in proton-exchange membrane fuel cells has a diffusion zone and an active zone. In conventional manner, the diffusion zone can include a substrate such as a carbon or graphite cloth which provides the diffusion function for the purpose of distributing a gas it receives to the active zone, a current collector function, because of its ability to conduct electricity, and a structural function of imparting mechanical strength to the electrode. The active zone includes a catalyst such as platinum, which comes in contact with an electrolyte.

Such an electrode is described in document FR-2 744 840 A1. The diffusion zones is defined by a layer formed by a carbon cloth embedded in a hydrophobic material, poytetrafluoroethylene (PTFE) filled with carbon black, The active zone is formed by grains of optionally activated carbon, supporting particles of platinum in contact with a solid electrolyte, such as "Nafion" from DuPont de Nemours.

Known electrodes of that type suffer from limitation phenomena. The activated carbon grains are tortuous to such an extent as to make it difficult for the fuel gas ($H_2$) to gain access to the catalyst particles. The same limitation exists when extracting protons ($H^+$) for migration through the electrolyte. Furthermore, the structure of the active zone which is constituted by accumulated carbon grains having a diameter lying in the range a few hundreds of nm to a few $\mu$m, gives rise to a damaging ohmic drop.

In addition, the method of manufacturing those known electrodes includes heat treatment to sinter the PTFE, which treatment is performed after the active zone has been formed, and which can therefore spoil the catalyst.

Other documents relate to gas diffusion electrodes suitable for use in electrochemical processes that require the catalyst (Pt) to be fixed directly on activated carbon fibers.

This applies to the document by T. Yamamoto et al. "Electrochemical reduction of $CO_2$ in micropores", Studies in Surface Science and Catalysis, Vol. 114, 1998, XP-002119197. The diffusion zone of the electrode is formed by a mixture of acetylene black and of PTFE, while the active zone is formed of a mixture of activated carbon fibers carrying the metal catalyst, acetylene black, and PTFE. The result is shaped and subjected to heat treatment.

Reference can also be made to the document by J. H. Liew et al., "Cathode performance of AFC/acetylene black hybrid electrodes for phosphoric acid fuel cell", TANSO 1992 [No. 155], pp. 407–410, XP-002119196. A mixture of carbon black on which platinum has been fixed, of short fibers of activated carbon on which platinum has been fixed, and of PTFE is shaped and subjected to heat treatment so as to sinter the PTFE. In that case also, heat treatment is applied after the catalyst has been fixed. The presence of short fibers of activated carbon improves the properties of the electrode in terms of current density, with an optimum being obtained when the proportion by weight of activated carbon fibers carrying platinum is 20% and that of acetylene black carrying platinum is 80%.

A simplification of the above process for making an electrode for the same application is proposed in the document JP-64/014873 A which proposes using only short fibers (5 mm to 6 mm long) of activated carbon provided with catalyst. It is also proposed to do without the hydrophobic material (PTFE), assuming that the phosphoric acid wets the micropores of the fibers without closing off the macropores of the fiber substrate. However, that cannot always be transposed to other gas diffusion electrode applications using fibers and in which the presence of hydrophobic material remains necessary, at least in the diffusion zone.

OBJECTS AND SUMMARY OF THE INVENTION

An object of the invention is to propose gas diffusion electrodes enabling the operation and the efficiency of electrochemical devices in which they are used to be improved.

Another object of the invention is to propose a method of manufacturing gas diffusion electrodes which do not spoil the catalyst and which, in addition, make it possible to use the catalyst optimally.

According to the invention, in a gas diffusion electrode comprising a porous substrate of activated carbon fibers on which particles of a catalyst for an electrochemical reaction are fixed directly, the substrate is a cohesive fabric that is at least partially coated in a hydrophobic material.

The term "activated carbon fibers" is used herein to mean continuous or discontinuous filaments of activated carbon, and preferably continuous filaments so as to favor electronic conduction.

The term "cohesive fabric of activated carbon fibers" is used herein to mean a fabric that inherently possesses mechanical properties that are sufficient not only to enable it to be handled during the process of manufacturing the electrode, but also to confer on it the mechanical strength required for its intended use.

The activated carbon fiber fabric is preferably a woven cloth. Other cohesive fabrics could be used, such as sheets of unidirectional fibers, possibly superposed in different directions, and bonded together, e.g. by needling. For convenience, in the description below, the term "cloth" is used to designate a cohesive fabric regardless of whether or not it is woven.

The invention is remarkable in that the activated carbon fiber cloth performs simultaneously the functions of diffusing the gas admitted through the cloth, of conducting electrons, of providing a structural element that gives mechanical strength to the electrode, and of supporting the catalyst.

Advantageously, the cloth offers an array of microchannels to the admitted gas and leading to the particles of catalyst, thereby enabling the gas to react with each active portion supported by the cloth.

Since the activated carbon fiber cloth is organized in the form of an array of small diameter filaments, the tortuous nature and the ohmic drop are both smaller than is the case with the carbon grains used in the abovementioned prior art.

In addition, the activated carbon fiber cloth which is preferably mace of cellulose precursor fibers and more particularly of rayon precursor fibers, advantageously presents porosity characterized by pores of very small mean size, typically lying in the range 0.3 nm to 10 nm, thereby enabling maximum dispersion of the catalyst particles and enabling them to have a size that is optimal for the purpose of best operation of the electrode.

According to a feature of the activated carbon fiber cloth, it has a first face that is coated in a hydrophobic material such as PTFE, and a second face to which the catalyst particles are fixed.

In another aspect, the invention provides a method of making a gas diffusion electrode comprising the steps of supplying a substrate of activated carbon fibers, putting the substrate in contact with a precursor for an electrochemical reaction catalyst, and treating the precursor to obtain particles of catalyst fixed on the fibers of the substrate, the method being characterized in that an activated carbon fiber substrate is used in the form of a cohesive fabric having a first face and a second face, a portion of the fabric adjacent to its first face is coated in a hydrophobic material, and the catalyst is deposited on the fibers of the remaining portion of the fabric adjacent to its second face.

Advantageously, a controlled oxidation treatment of the activated carbon fiber cloth is performed prior to depositing the catalyst, so as to increase the concentration of functional groups constituting the surface chemistry of the activated carbon cloth.

The catalyst can be deposited by cation exchange or by liquid impregnation using a precursor salt for the catalyst. Such methods of depositing catalyst on activated carbon fibers are described in patent application WO 99/26721 A in the name of the Applicant. Depositing catalyst on activated carbon fibers by cationic exchange in order to obtain substrates having high level catalytic and electrocatalytic properties has also been envisaged in the document by P. P. Andonoglou et al., "Preparation and electrocatalytic activity of rhodium modified pitch-based carbon fiber electrodes", Electrochimica Acta 44 (1998), pp. 1455–1465.

Advantageously, the precursor is a salt of the catalyst, and the treatment of the precursor comprises a step of reducing the salt by means of a gas admitted through the first face of the cloth.

All of the active catalyst obtained by such treatment is therefore necessarily accessible subsequently to a gas when the electrode is being used, thereby offering a maximum potential use of the catalyst. The electrode obtained in this way thus provides an array of microcharnels enabling the gases to reach each active portion supported by the activated cloth.

The activated carbon fiber cloth can be obtained in various ways.

A first possibility consists in using a carbon precursor fiber cloth, in particular a cellulose cloth, and more particularly a rayon cloth, and in implementing a stage of heat treatment for carbonizing the carbon precursor. The resulting carbon fiber cloth is activated by heat treatment under an oxidizing atmosphere.

A second possibility consists in starting with a carbon precursor fiber cloth and impregnating it with a composition suitable, after carbonization, for obtaining an activated carbon fiber cloth directly. The carbon precursor is preferably a cellulose, and more particularly rayon. Impregnation is performed using a composition containing an inorganic ingredient with the function of promoting dehydration of the cellulose, e.g. phosphoric acid.

The activated carbon fiber cloth can be coated in part in a hydrophobic material in various ways: the first face of the cloth can be coated, the cloth can be rolled together with a sheet of hydrophobic material placed on the first face of the cloth, a sheet of hydrophobic material can be stuck onto the first face of the cloth, or a composition containing the hydrophobic material can be sprayed onto the first face of the cloth, while the second face is advantageously heated, e.g. to a temperature in the range 120° C. to 160° C., so as to prevent the composition from fixing on that face.

The hydrophobic material is sintered by heat treatment performed prior to depositing the catalyst, and thus incapable of affecting the catalyst.

Also advantageously, the method is implemented on a traveling strip of activated carbon fiber cloth from which electrodes are subsequently cut out.

BRIEF DESCRIPTION OF THE DRAWINGS

In the detailed description given below by way of non-limiting indication, reference is made to the accompanying drawings, in which.

DETAILED DESCRIPTION OF PREFERRED EMBODIMENTS

Figures 1, 3:
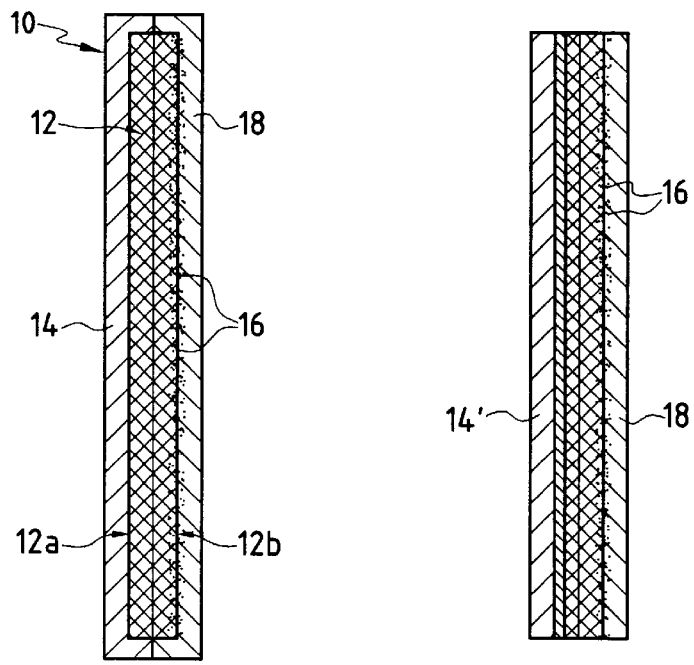
FIG. 1 is a highly diagrammatic view of a first embodiment of a gas diffusion electrode of the invention.
FIG. 3 is a highly diagrammatic view of a second embodiment of a gas diffusion electrode of the invention.

FIG. 1 shows a gas diffusion electrode 10 of the invention in an electrochemical cell of a fuel-cell battery having a proton exchange membrane.

In such a cell, two electrodes respectively receiving hydrogen gas ($H_2$) and oxygen gas ($O_2$) support a catalyst which is usually platinum (Pt) in the form of particles. The electrodes are separated by a membrane of solid electrolyte, usually "Nafion" from DuPont de Nemours, which presents proton-exchanging $SO_3-$ ion groups.

At the anode which receives $H_2$, the catalyzed reaction is as follows:

$$H_2 \rightarrow 2H^+ + 2e^-$$

The protons ($2H^+$) are transported through the membrane to the cathode where the catalyzed reaction is:

$$\tfrac{1}{2}O_2 + 2H^+ + 2e^- \rightarrow H_2O$$

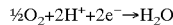

The flow of electrons ($2e^-$) between the anode and the cathode gives rise to an electric current that is used in a load external to the fuel-cell battery.

The electrode 10, e.g. the anode, comprises an activated carbon fiber cloth 12. As already mentioned, other types of cohesive fabric capable of performing the structural and electron conduction functions could be used, e.g. sheets of unidirectional fibers, optionally superposed in different directions and bonded together, e.g. by needling.

The face 12a of the cloth 12 that is exposed to the incident gas (H$_2$) and that serves to perform a diffusion function is coated in a matrix 14 of a gas-permeable hydrophobic material which occupies substantially half the thickness of the cloth. By way of example, the material 14 is microporous PTFE.

The portion of the cloth that is not coated in the matrix 14, and in particular the face 12b remote from the face 12a, carries particles 16 of catalyst, and in this case of platinum (Pt). This part of the cloth carrying the catalyst is itself coated in a matrix 18 containing a solid electrolyte such as "Nafion" and also capable of containing a hydrophobic material such as PTFE, in respective weight percentages that are typically 90% and 10%.

The structure of the cathode is similar to that of the anode, although the quantity of catalyst deposited thereon and the relative proportions of "Nafion" and of PTFE can nevertheless be different.

Because of its hydrophobic nature, the PTFE prevents the activated carbon fiber cloths that act as current collectors from being drowned in the water produced by the reaction.

Microporous hydrophobic materials other than PTFE can be suitable for the matrices 14 and 18. In particular, it is possible to select fluorinated polymers such as PVDF (polyvinylidene fluoride) or PVF (polyvinyl fluoride), which can be used on their own or in combination with one another and/or with PTFE.

The activated carbon fiber cloth is preferably made of cellulose precursor fibers, and in particular of rayon precursor fibers. The cloth, particularly when it is made of rayon precursor fibers, presents a specific surface area, a microporosity, and a density of surface functional groups (active sites) which make it suitable for fixing the metal catalyst effectively, not only when it is constituted by platinum, but also when it is constituted by ruthenium, rhenium, palladium, iridium, nickel, or other metals or combinations of metals known as catalysts. The specific surface area is not less than 200 square meters per gram (m$^2$/g), preferably not less than 600 m$^2$/g, and can reach or even exceed 1500 m$^2$/g. Porosity is characterized by pores of mean dimensions lying in the range 0.3 nm to 10 nm. In addition, rayon precursor carbon fibers present a surface density of oxygenated groups suitable for encouraging the presence of active sites. Advantageously, the cloth is nevertheless subjected to controlled oxidation treatment, e.g. using sodium hypochlorite, so as to dope the surface chemistry of the activated carbon fibers and ensure that the catalyst is well dispersed.

Nevertheless, the invention is not limited to cellulose and in particular rayon precursors, even though they are preferred. The activated carbon cloth fibers can be derived from other carbon precursors such as preoxidized polyacrylonitrile (PAN), phenol precursors, and isotropic pitches, preferably with oxidation treatment, e.g. using nitric acid, prior to deposition of the catalyst.

Figure 2:
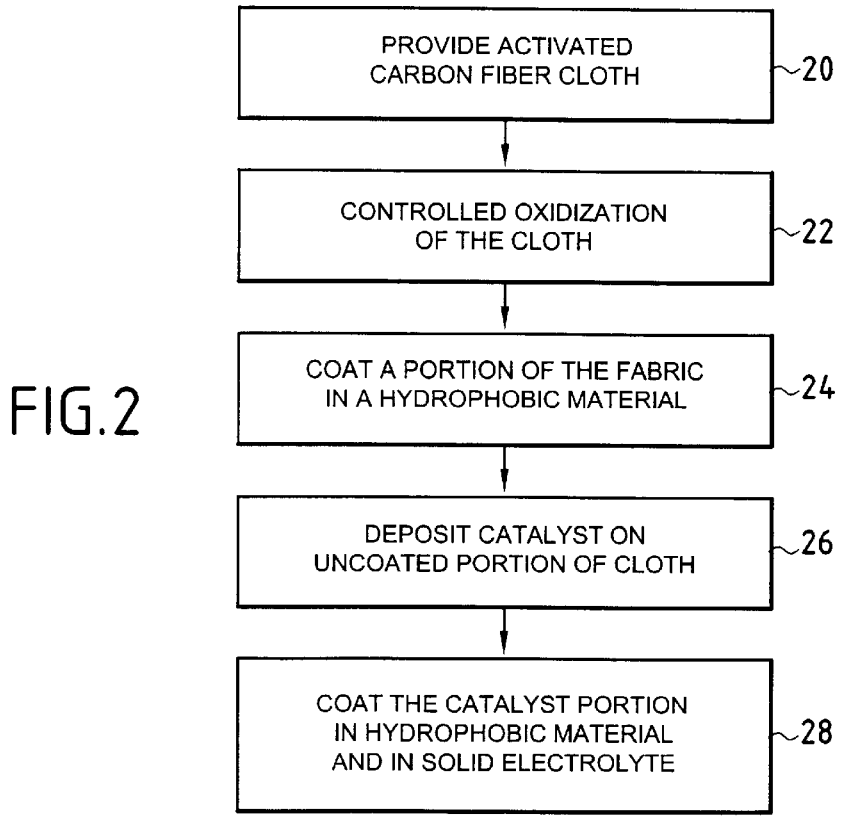
FIG. 2 shows the successive steps in a method of making the electrode of FIG. 1.

FIG. 2 shows successive steps in a method of making the electrode 10.

The first step 20 consists in supplying an activated carbon fiber cloth. As mentioned above, this can be done in two different ways.

A first possibility consists in starting from a carbon fiber cloth and in subjecting it to activation treatment. The carbon fiber cloth is obtained directly from threads of carbon derived from a carbon precursor by means of heat treatment, or else from carbon precursor threads, with the heat treatment for transforming the precursor being performed after the cloth has been made.

The carbon precursor used is a cellulose, and more particularly a rayon. The heat treatment for transforming rayon to carbon comprises a precarbonization stage at a temperature lying in the range 350° C. to 420° C., and preferably equal to about 400° C., followed by a final carbonization stage at a temperature lying in the range 1000° C. to 1300° C., and preferably at 1200° C., under an atmosphere of nitrogen and for a duration lying in the range 0.7 minutes (min) to 1.3 min. Final carbonization can be performed under low pressure, e.g. lying in the range 5 Pa to 60 Pa, thereby favoring the removal of impurities which are entrained with the exhaust gases and favoring migration of alkaline impurities to the surface of the fibers where they can be eliminated merely by rinsing in demineralized water, without requiring washing in an acid.

This gives rise to carbon fibers of great purity, with a carbon content in excess of 99%, an ash content of less than 0.3%, and an alkaline impurity content of less than 1500 parts per million (ppm). The resulting fibers are also remarkable in that they are structurally constituted by a large number of small crystallites having a mean height $L_c$ of about 1 nm and a mean lateral size $L_a$ of about 3 nm. These crystallites offer a large number of active sites at the margins of graphene planes which favor the formation of surface functional groups when the fabric is re-exposed to air after carbonization. Subsequent activation considerably amplifies the density of surface functions.

Activation is performed by subjecting the carbon fiber cloth to heat treatment under an oxidizing atmosphere such as steam, or preferably carbon dioxide, or a mixture of carbon dioxide and steam. Heat treatment takes place at a temperature that lies preferably in the range 850° C. to 950° C., and its duration preferably lies in the range 50 minutes (min) to 300 min as a function of the desired specific surface area. It is possible to perform activation continuously by causing the carbon fiber cloth to travel through a heat treatment zone in an oven in which a flow of oxidizing gas is maintained. Such a method is described, for example, in document FR 2 741 363 A.

Activation confers the desired specific surface area and porosity to the cloth. The specific surface area is greater than 600 m$^2$/g, and even greater than 1500 m$^2$/g. The porosity is characterized by pores having a mean diameter lying in the range 0.3 nm to 10 nm and overall porosity lying in the range 30% to 50%. This is measured by the known technique of small angle X-ray scattering (the SAXS technique). It consists in exposing the fibers to an X-ray beam under conditions such that electron density contrast exists between empty spaces (pores) and matter (carbon), so that scattering intensity is related to the overall porosity of the carbon fibers.

A second possibility consists in starting with a carbon precursor fiber cloth and in impregnating it with a composition that is suitable, after carbonization, for obtaining directly an activated carbon fiber cloth.

The carbon precursor is preferably a cellulose, and more particularly a rayon. Impregnation is performed using a composition containing an inorganic ingredient having a function for promoting dehydration of cellulose, e.g. selected from phosphoric acid, zinc chloride, potassium sulfate, potassium hydroxide, diammonium phosphate, and ammonium chloride. impregnation is preferably performed by a composition containing phosphoric acid so that the mass of acid fixed on the cloth lies in the range 10% to 22% of the mass of dry cloth. The heat treatment comprises raising temperature at a rate lying in the range 1° C./min to 15° C./min followed by a pause at a temperature lying in the range 350° C. to 500° C. under an inert atmosphere or under an atmosphere containing a reaction activator such as carbon dioxide or steam. Such a method is described in international patent application WO 98/41678 A in the name of the Applicant. This makes it possible to obtain an activated carbon fiber cloth having a specific surface area greater than 600 m$^2$/g, e.g. about 1000 m$^2$/g, or even more. To improve electrical conductivity, it is possible to perform post-treatment at a temperature of about 1000° C. and under a non-oxidizing atmosphere, e.g. under nitrogen, for about 3 min.

In either of the two possibilities described above, electrical conductivity of the resulting activated carbon fibers can be improved by using a rayon precursor that contains carbon black, the carbon black being incorporated in the viscose bath prior to spinning.

A second step 22 s preferably performed which consists in subjecting the activated carbon cloth to controlled oxidation so as to improve its surface chemistry and subsequently favor dispersion of catalyst particles.

This controlled oxidation can be performed by immersing the cloth in a bath having an oxidizing composition, then possibly washing the cloth, rinsing it in water, and drying it. By way of example, the oxidizing composition is a solution of sodium hypochlorite NaOCl, with washing being performed by passing subsequently through a bath of hydrochloric acid. Other oxidizing compositions can be used, for example nitric acid HNO$_3$. The "controlled" nature of the oxidation means that exposure to the oxidizing compound is limited, e.g. for 1 hour (h) to 3 h in a solution of NaOCl having 2.5% active chlorine, at ambient temperature.

The following step 24 consists in coating that portion of the activated carbon fiber cloth that comprises the face 12a thereof in a matrix of microporous hydrophobic material, while leaving it other face 12b free.

It is possible to coat the face 12a of the cloth with a liquid composition. This is performed using a liquid composition having surface tension greater than that of the cloth 12 so as to prevent the cloth being completely wetted and so as to restrict matrix formation to the face 12a only. By way of example, an emulsion is used that is based on one or more fluorinated polymers, such as PTFE, PVDF, DVF, which have had one or more wetting agents added thereto.

Another possibility consists in spraying the hydrophobic material by means of nozzles onto the face 12a of the cloth, while heating the other face 12b in a flow of hot air. Heating is performed to a temperature lying in the range 120° C. to 160° C., e.g. a temperature at around 150° C. Because of the heating, no particles of hydrophobic material manage to migrate to the face 12b, so that only that portion of the cloth which is adjacent to its face 12a is coated. The desired quantity of hydrophobic material can be sprayed in a plurality of successive passes. Adhesion of the hydrophobic material on the face 12a of the cloth is favored by the intrinsic properties of activated carbon fibers: surface chemistry favors physico-chemical bonding of the material and a multi-lobe morphology of the fibers which, in association with the tangling of the fibers of the cloth, favors "mechanical" bonding of the material.

In a variant, and as shown in FIG. 3, a thin sheet 14' of fluorinated polymer can be pressed against the face 12a of the cloth 12 and can be rolled together therewith or can be stuck thereon. A thin sheet, e.g. a web weighing 12 g/m$^2$ to 50 g/m$^2$, of polyester, polyamide, or polyurethane can be interposed between the sheet 14' and the cloth 12.

The material of the matrix 14, e.g. PTFE, is advantageously filled with carbon black. It is subsequently sintered at a temperature lying in the range about 350° C. to 390° C.

The following step 26 consists in depositing the catalyst on the portion of the cloth 12 that remains free, i.e. the portion adjacent to its face 12b.

To this end, it can be impregnated with an aqueous solution containing a precursor of the catalyst, preferably a precursor suitable for giving the desired catalyst by a reduction reaction. With platinum, the precursor can be H$_2$PtCl$_6$, for example. The hydrophobic nature of the material of the matrix 14 restricts impregnation to the portion of the cloth 12 that has remained free, and that is the desired objective.

After impregnation, the platinum is reduced under a flow of hydrogen gas. Advantageously, the hydrogen gas is admitted through the face 12a coated in the microporous matrix 14. The platinum reduced in this way will necessarily be available subsequently to hydrogen gas or to any other gas. The preferred path created in this way serves to eliminate the phenomenon whereby gas diffusion towards the catalyst turns out to be limited when the electrode is in use.

In a variant, the catalyst can be deposited by cationic exchange. The activated carbon fiber cloth 12 is introduced into a bath containing ammonia together with a dissolved mass of catalyst precursor salt and while bubbling through nitrogen. When the catalyst is platinum, the precursor salt can be Pt(NH$_3$)$_6$,Cl$_2$ and the molar ratio between ammonia and the precursor salt can lie in the range, for example, 1 to 0.01. The system can be left to reach equilibrium for about 1 hour. In the ammonia medium, protons are taken from anchor sites of the –OH type at the surface of the carbon fibers, thereby favoring formation of an ionic bond with the metal salt Pt(NH$_3$)$_6^{2+}$, 2Cl$^-$. Once the metal Pt has been fixed strongly to the surface of the activated carbon fibers by ionic bonding, the fabric is washed and dried. Thereafter the platinum is reduced, e.g. by means of a flow of hydrogen gas which is advantageously administered through the face 12a of the cloth 12.

The use of a cellulose precursor, and in particular of a rayon precursor, for the activated carbon fiber cloth presents the advantage of conferring on the cloth both microporosity and surface functional group density (active sites) which make the cloth suitable for fixing the metal catalyst in the form of very small particles. Rayon precursor carbon fibers have a residual oxygen density that favors the presence of active sites. The resulting density of surface functional groups is thus high and can be further increased by the controlled oxidation step. The surface chemistry, which is characterized by Boehm's method, gives rise to acid functional groups at a density of 0.3 millimeters per gram (meq/g) to 0.8 meq/g, with 0.02 meq/g to 0.06 meq/g of carboxylic functions prior to controlled oxidation, and can rise to 2 meq/g to 3 meq/g of carboxylic functions after controlled oxidation using sodium hypochlorite.

The porosity and surface chemistry characteristics enable the catalyst to be dispersed in the form of fine particles, of mean size lying in the range about 1 nm to about 3 nm, with an exceptionally high dispersion rate, lying in the range 0.3 to 0.7, with dispersion being favored by the controlled oxidation treatment. Dispersion rate is the ratio of the number of metal atoms on the surface over the total number of metal atoms. It is measured by hydrogen chemisorption. The mass percentage of platinum deposited relative to the mass of activated carbon fiber cloth on its own can easily exceed 3% and can reach 7% or more. The method of fixing the catalyst by liquid impregnation or by cationic exchange and reduction also presents the particular advantage of distributing the catalyst in uniform manner over the activate carbon cloth.

In particular, for application to an electrochemical cell of a fuel-cell battery with a proton exchange membrane, a final step 28 consists in coating the portion of cloth 12 that carries the catalyst in a matrix 18 of "Nafion" and of hydrophobic material, e.g. PTFE. To this end, the face 12b of the fabric 12 is sprayed with a liquid composition containing both "Nafion" and PTFE in a desired ratio.

EXAMPLE

An activated carbon fiber cloth was made from rayon satin cloth constituted by multifilament viscose, the cloth being made using 15×15 structure woven threads (15 threads per cm both in the warp direction and in the weft direction).

After de-oiling, the cloth was carbonized by being raised to a temperature of about 400° C. for about 12 h and then to a final temperature of about 1200° C. for about 1 min under nitrogen at a pressure of 30 Pa. The resulting cloth was activated by causing the cloth to pass through a heat treatment zone of an oven under an atmosphere constituted by 100% carbon dioxide. The zone was defined by a tunnel-shaped baffle along which the cloth was advanced continuously. Activation treatment was performed at a temperature of about 920° C. and the time spent at that temperature was about 1 h.

The resulting activated carbon cloth presented the following characteristics:

thickness: 600 $\mu$m;

specific surface area: about 1000 m$^2$/g;

carbon content: greater than 99%;

ash content: less than 0.3%;

alkaline impurity content: less than 1500 ppm;

thread size: about 65 tex (g/1000 m);

fiber size: an average diameter of 9 $\mu$m (with appearance characteristic of multi-lobe type fibers); and surface chemistry: acid functional groups at a concentration of 0.3 meq/g to 0.8 meq/g, including 0.02 meq/g to 0.06 meq/g of carboxylic functions on the surface of the fibers.

Figure 4A:
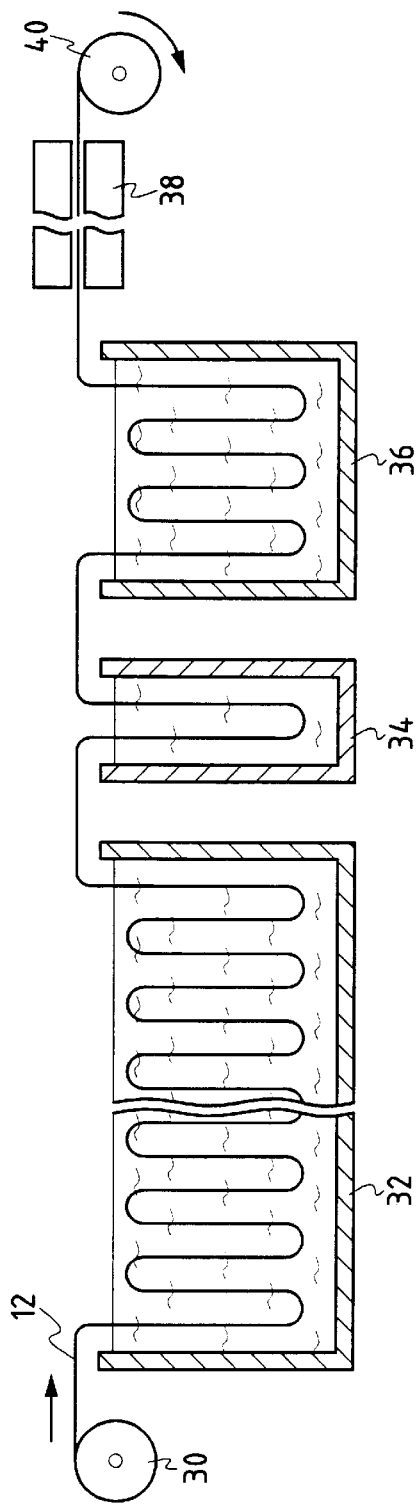
FIGS. 4A to 4C show an implementation of the method of the Invention on a traveling strip of activated carbon fiber cloth.

Cloth was subjected to controlled oxidation using sodium hypochlorite. This could be done on the cloth traveling continuously (FIG. 4A).

The activated carbon cloth 12 unreeled from a reel 30 was immersed in a bath 32 of sodium hypochlorite NaOCl with 2.5% active chlorine and it remained therein for 2 h at ambient temperature. Thereafter, the cloth was washed in a bath 34 of 1N hydrochloric acid HCl in which it remained for 10 min at ambient temperature. Rinsing was then performed in a bath 36 of demineralized water for a transit time of 30 min. The activated carbon cloth oxidized in this way was admitted into an oven 38 to be dried for 1 h at 160° C. prior to being taken up on a reel 40. The surface chemistry of the oxidized cloth revealed an average concentration of 2.8 meq/g of carboxylic acid functions.

Figure 4C:
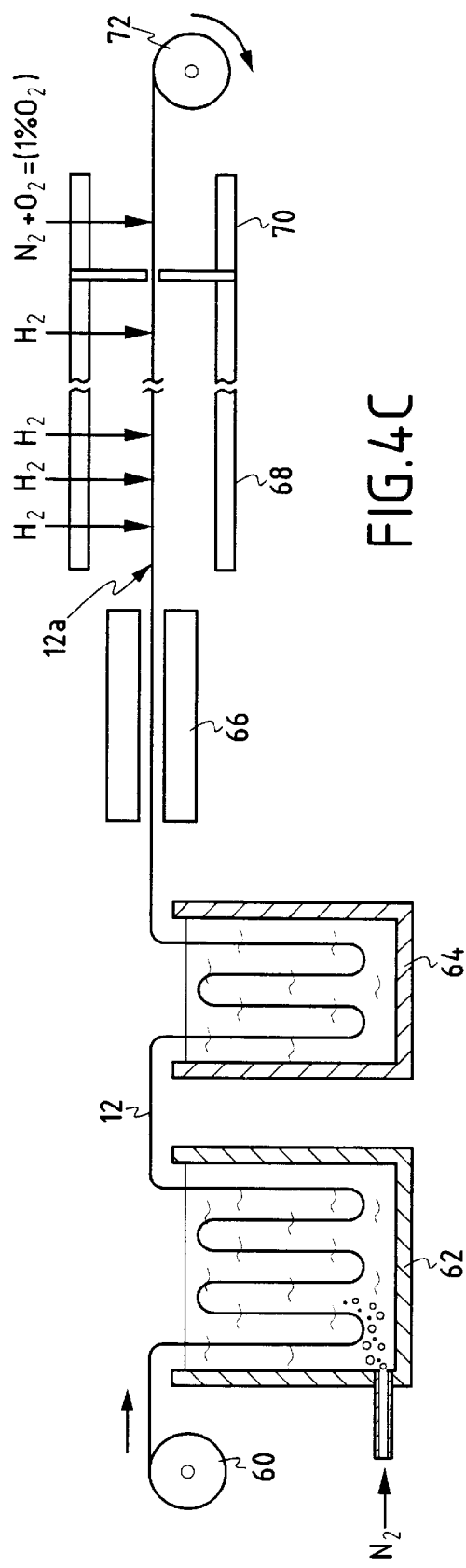
Figure 4B:
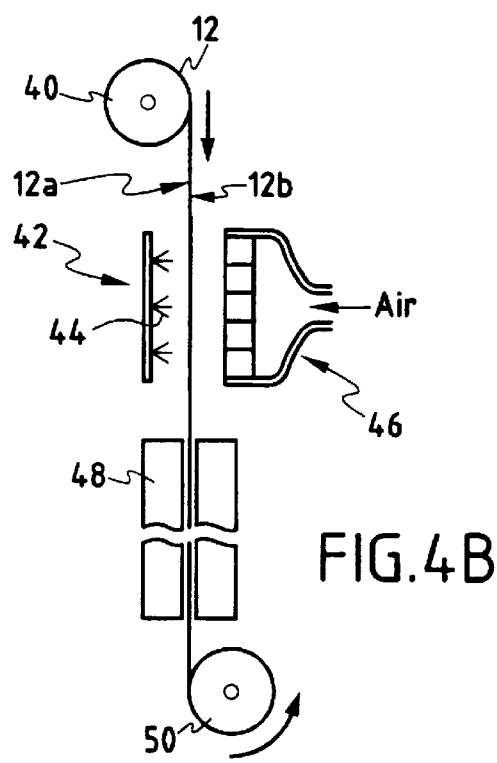

The cloth was then coated on its face 12a in PTFE, and this operation was likewise preferably performed using a continuous process (FIG. 4B).

The cloth 12 was unreeled from the reel 40 and passed through a spray station 42 between one or more rows of nozzles 44 directed towards the face 12a of the cloth and means 46 for blowing hot air. The nozzles were fed with PTFE plus carbon black at a pressure of 2×10$^5$ Pa. The air coming from a blower (not shown) was applied to the face 12b of the cloth as it passed through an electrical heater device so as to ensure that the temperature of the air reaching the surface of the cloth was about 150° C. The PTFE sprayed onto the face 12a of the cloth was sintered at a temperature of 380° C. by passing through an oven 48, after which the cloth was taken up on a reel 50 at the outlet from the oven.

A first layer of PTFE representing 10% by weight of the mass of the cloth on its own was thus formed.

A second layer of sintered PTFE was subsequently formed in the same manner by taking the cloth wound on the reel 50, with the quantity of PTFE sprayed being selected so as to form an additional layer representing 30% by weight of the weight of the cloth on its own.

The final layer of PTFE on the face 12a of the cloth had a total thickness equal to about 110 $\mu$m, and it was entirely uniform. The face 12b was completely free of PTFE since the flow of hot air at 150° C. had prevented any grains of PTFE from migrating to said face.

The cloth 12 partially coated in PTFE was provided with catalyst particles which were deposited on its face 12b, and again the preferred method of doing this is a process in which the cloth travels continuously (FIG. 4C).

The cloth was unreeled from a reel 60 and passed through a bath 62 containing ammonia and a dissolved salt Pt(NH$_3$)$_6$, Cl$_2$ representing a molar ratio of 1 to 0.01, while nitrogen was bubbled through. The transit time was about 1 h. The cloth was then washed by passing through a bath 64 of demineralized water with a transit time of about 30 min.

On leaving the bath 64, the cloth was dried by passing through a tunnel 66 at a temperature of about 120° C. under nitrogen and it was then admitted into a hydrogenating oven 68 in which the platinum salt was reduced at a temperature of about 300° C. Hydrogen gas was admitted through the face 12a of the cloth.

On leaving the oven 68, the cloth passed through a passivation compartment 70 under a mixture of nitrogen and oxygen (having a volume concentration of oxygen of 1%) prior to being taken up on a storage reel 72.

The method used for depositing the catalyst, with prior controlled oxidation of the activated carbon cloth, ensured that particles of catalyst were uniformly distributed over the surfaces of those fibers that were accessible to the gas passing through the face 12a of the cloth. This optimized use of the reduced catalyst.

The quantity of platinum fixed on the cloth was about 3% by weight relative to the weight of the cloth on its own.

Figure 5:
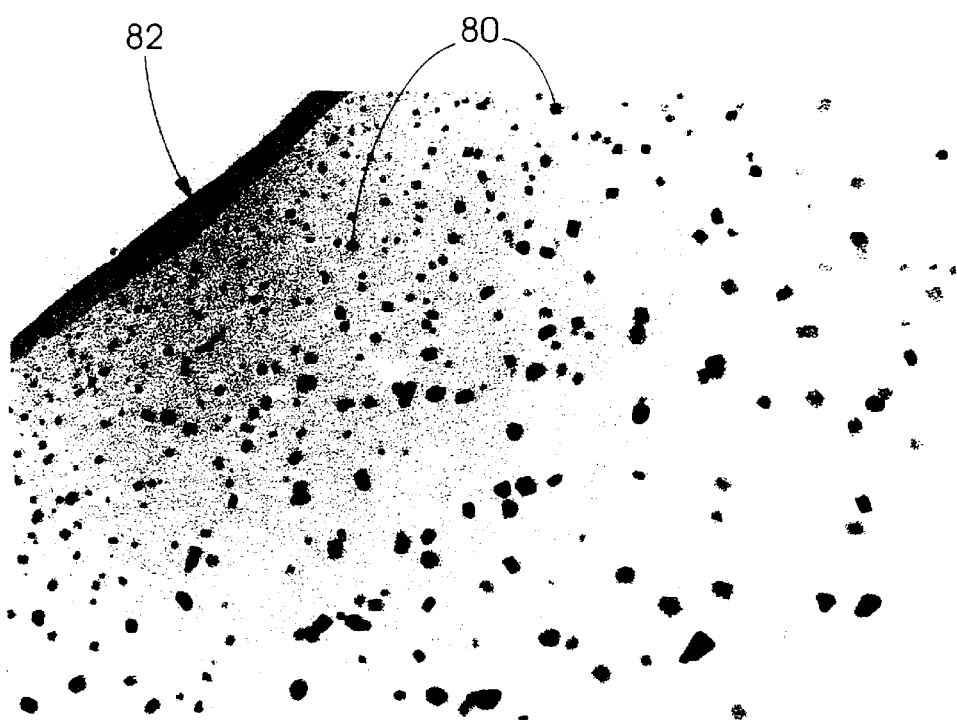
FIG. 5 is a transmission electronic microscope picture showing particles of catalyst on the surface of an activated carbon fiber in an electrode made in accordance with the invention.

FIG. 5 shows the particles or grains of platinum 80 on the surface of a fiber 82 of the cloth obtained after the platinum salt had been reduced.

Figure 6:
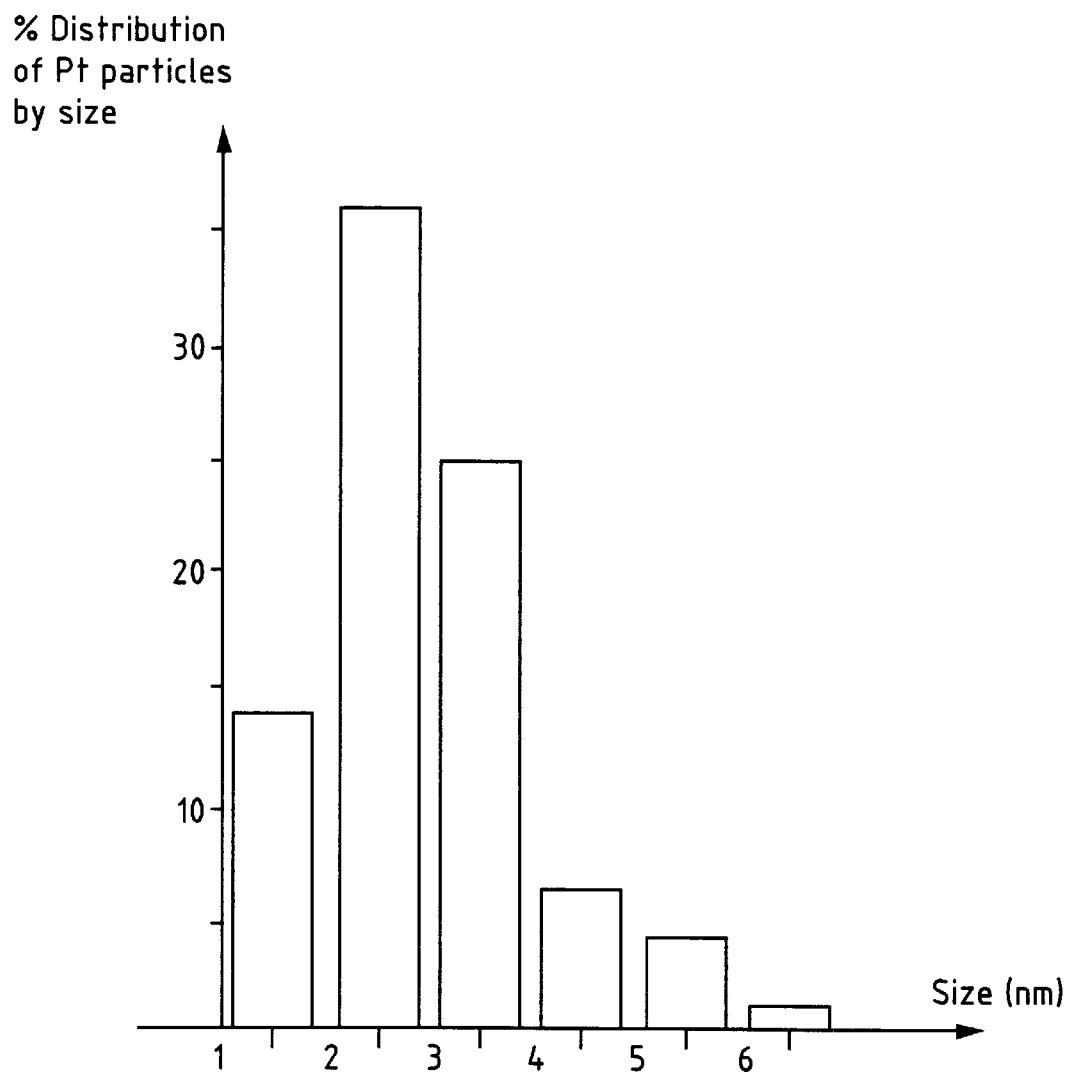
FIG. 6 is a histogram showing the size distribution of particles of catalyst fixed on the activated carbon fibers of an electrode made in accordance with the invention.

The platinum particles were present essentially on the periphery of fibers over a thickness of 0.1 $\mu$m. The size distribution of the particles can be seen in FIG. 6. The size distribution was substantially uniform in size and centered on 2.5 nm.

The passivation treatment in the compartment 70 gave the strip of cloth carrying the catalyst particles sufficient stability to be kept as such without further treatment prior to being cut up into electrodes of the desired size, and prior to the face 12b carrying the catalyst being coated in a solid electrolyte or being put into contact with a liquid electrolyte, depending on the intended application.

As already mentioned, the face 12b can be coated in a solid electrolyte of the type comprising "Nafion" and PTFE in order to form the matrix 18 of FIG. 1 by spraying a composition containing both "Nafion" and PTFE in the desired ratio onto the face 12b. This coating can be performed on electrodes that have been cut apart or on a strip of cloth unreeled continuously from the reel 72, with the strip being cut up subsequently.

An electrode as obtained by a method as described above can also be used advantageously in an electrochemical cell for manufacturing chlorine or caustic soda using a liquid electrolyte.

In a conventional method for manufacturing chlorine or caustic soda, an electrochemical reactor is used that contains an aqueous solution of NaCl as the electrolyte. A membrane is placed in the reactor between the anode and the cathode, with the pH of the electrolyte being equal to about 3 on the anode side and about 14 on the cathode side. On the anode side, the reaction produces chlorine gas:

$$2Cl^- \rightarrow Cl_2 + 2e^-$$

On the cathode side, the reaction produces caustic soda and hydrogen gas, which is generally burnt off in a torch:

$$2Na^+ + 2e^- + 2H_2O \rightarrow 2NaOH + H_2 \rightarrow$$

As much chlorine is produced as caustic soda. The thermodynamic potential difference between the anode and the cathode is theoretically equal to 2.18 V, but reaches a value of about 3 V in practice because of the extra voltages associated with various reaction kinetics and with ohmic losses through the electrolyte and the membrane.

By using a gas diffusion electrode as an electrode for diffusing air (or oxygen) for the cathode or as an electrode for diffusing hydrogen for the anode, special advantages can be obtained.

Thus, by feeding oxygen gas to a gas diffusion electrode used as a cathode, the reactions at the anode side and at the cathode side become the following respectively:

$$4Cl^- \rightarrow 2Cl_2 + 4e^- O_2 + 2H_2O + 4Na^+ + 4e^- \rightarrow 4NaOH$$

There is no hydrogen gas ($H_2$) to be burnt off. Furthermore, compared with the traditional electrochemical process, the thermodynamic potential difference is considerably decreased, which gives an energy saving of 25% to 30%, and is thus a considerable advantage for an electrochemical process which is traditionally a very large consumer of electricity.

By feeding hydrogen gas to a gas diffusion electrode that is used as an anode, the reactions on the anode side and on the cathode side become respectively:

$$H_2 \rightarrow 2H^+ + 2e^- \text{ and } Cl^- + H^+ \rightarrow HCl2Na^+ + 2H_2O + 2e^- \rightarrow 2NaOH + H_2$$

Compared with the traditional electrochemical process, the thermodyamic potential difference is decreased.

Furthermore, as in the preceding case, very pure sodium hydroxide is obtained that is suitable for use in pharmacy. Furthermore, no gaseous chlorine is given off.

The description above relates to platinum being fixed as the catalyst. Other metallic catalysts can be fixed directly on an activated carbon fiber cloth, in particular by using an impregnation process, e.g. a cation exchange process, with reduction subsequently being performed preferably but not exclusively by the hydrogen gas diffused through the activated carbon cloth.

The impregnation process can be used with metals M that can be in the form of an anionic complex $MCl_x$ in an acid medium, while the cationic exchange process can be used with metals M which can be in the form of a cationic salt of the $[M(NH_3)_x]^{Y+}$, $yCl^-$ type, for example.

Metallic catalysts can be selected from noble metals other than platinum, such as palladium, iridium, rhodium, or from transition elements, in particular cobalt, iron, nickel, copper, and manganese. It is also possible to fix bimetallic catalysts on the activated carbon fiber cloth by associating two noble metals or a noble metal and a transition element, e.g. palladium-copper or palladium-nickel catalysts.

What is claimed is:

1. A gas diffusion electrode comprising a porous substrate of activated carbon fibers, wherein the fibers are made of rayon precursor on which particles of a catalyst for an electrochemical reaction are fixed directly,
    the electrode being characterized in that the substrate is a cohesive fabric that is at least partially coated in a hydrophobic material.

2. An electrode according to claim 1, characterized in that the activated carbon fiber fabric is a woven cloth.

3. An electrode according to claim 2, characterized in that:
    the fabric presents an array of microchannels offering a gas access to particles of catalyst fixed on the fabric;
    that the fibers of the fabric are made of rayon precursor obtained from a viscose solution containing carbon black incorporated in the viscose solution prior to spinning;
    the activated carbon fiber fabric presents pores having a mean size lying in the range 0.3 nm to 10 nm;
    the activated carbon fiber fabric presents a specific surface area of not less than 600 m$^2$/g;
    the carbon fiber activated fabric has a first face coated in a hydrophobic material, and a second face opposite to the first and on which the particles of catalyst are fixed;
    the particles of catalyst are in contact with a solid electrolyte.

4. A reactor having a diffusion electrode according to claim 3 and characterized in that the electrode includes an air or oxygen diffusion cathode.

5. A reactor having a diffusion electrode according to claim 3 and characterized in that the electrode includes a hydrogen diffusion anode.

6. An electrode according to claim 1 characterized in that the fibers of the fabric are made of viscose precursor containing carbon black incorporated in the viscose solution prior to spinning.

7. An electrode according to claim 1 characterized in that the activated carbon fiber fabric presents pores having a mean size lying in the range 0.3 nm to 10 nm.

8. An electrode according to claim 1 characterized in that the activated carbon fiber fabric presents a specific surface area of not less than 600 m$^2$/g.

9. An electrode according to claim 1 characterized in that the carbon fiber activated fabric has a first face coated in a hydrophobic material, and a second face opposite to the first and on which the particles of catalyst are fixed.

10. An electrode according to claim 9, characterized in that the particles of catalyst are in contact with a solid electrolyte.

11. An electrochemical cell of a fuel-cell battery having a proton exchange membrane, characterized in that it includes at least one electrode according to claim 10.

12. A fuel cell having a proton exchange membrane, characterized in that it includes at least one electrochemical cell according to claim 11.

13. An electrochemical cell of a fuel-cell battery having a proton exchange membrane, characterized in that it includes at least one electrode according to claim 1.

14. A fuel cell having a proton exchange membrane, characterized in that it includes at least one electrochemical cell according to claim 13.

15. An electrochemical reactor, characterized in that it includes at least one gas diffusion electrode according to claim 1.

16. A reactor having a gas diffusion electrode according to claim 1 and characterized in that the electrode includes an air or oxygen diffusion cathode.

17. A reactor having a gas diffusion electrode according to claim 1 and characterized in that the electrode includes a hydrogen diffusion anode.

18. An electrode according to claim 1, characterized in that the fabric presents an array of microchannels offering a gas access to particles of catalyst fixed on the fabric.

19. A method of making a gas diffusion electrode comprising the steps of supplying a substrate of activated carbon fibers, putting the substrate in contact with a rayon precursor for an electrochemical reaction catalyst, and treating the precursor to obtain particles of catalyst fixed on the fibers of the substrate, the method being characterized in that an activated carbon fiber of rayon precursor is used in the form of a cohesive fabric having a first face and a second face, a portion of the fabric adjacent to its first face is coated in a hydrophobic material, and the catalyst is deposited on the fibers of the remaining portion of the fabric adjacent to its second face.

20. A method according to claim 19, characterized in that the activated carbon fiber fabric used is in the form of a woven cloth.

21. A method according to claim 20, characterized in that:
oxidation treatment is performed on the activated carbon fiber fabric prior to depositing the catalyst;
treatment of the catalyst precursor comprises a step of reduction by means of a gas admitted through the first face of the fabric;
the fabric is partially coated in a hydrophobic material by one of coating the first face of the fabric with a liquid composition and rolling the fabric together with a sheet of hydrophobic material placed on the first face of the fabric, and sticking a sheet of hydrophobic material on the first face of the fabric; and spraying a composition containing the hydrophobic material on the first face of the fabric.

22. A method according to claim 21, characterized in that:
the second face of the fabric is heated while the composition containing the hydrophobic material is being sprayed;
the hydrophobic material is filled with carbon black;
it includes a step of heat treatment to sinter the hydrophobic material prior to depositing the catalyst; and
it is implemented on a traveling strip of activated carbon fiber fabric, in which electrodes are subsequently cut out.

23. A method according to claim 19, characterized in that treatment of the catalyst precursor comprises a step of reduction by means of a gas admitted through the first face of the fabric.

24. A method according to claim 19, characterized in that the fabric is partially coated in a hydrophobic material by coating the first face of the fabric with a liquid composition.

25. A method according to claim 24, characterized in that it includes a step of heat treatment to sinter the hydrophobic material prior to depositing the catalyst.

26. A method according to claim 19, characterized in that the partial coating of the fabric by a hydrophobic material is performed by rolling the fabric together with a sheet of hydrophobic material placed on the first face of the fabric.

27. A method according to claim 19, characterized in that the fabric is partially coated in a hydrophobic material by sticking a sheet of hydrophobic material on the first face of the fabric.

28. A method according to claim 19, characterized in that the fabric is partially coated in a hydrophobic material by spraying a composition containing the hydrophobic material on the first face of the fabric.

29. A method according to claim 28, characterized in that the second face of the fabric is heated while the composition containing the hydrophobic material is being sprayed.

30. A method according to claim 19, characterized in that the hydrophobic material is filled with carbon black.

31. A method according to claim 19, characterized in that it is implemented on a traveling strip of activated carbon fiber fabric, in which electrodes are subsequently cut out.

32. A method according to claim 19, characterized in that oxidation treatment is performed on the activated carbon fiber fabric prior to depositing the catalyst.

* * * * *

UNITED STATES PATENT AND TRADEMARK OFFICE
CERTIFICATE OF CORRECTION

PATENT NO. : 6,444,347 B1
DATED : September 3, 2002
INVENTOR(S) : Ludovic Ouvry et al.

It is certified that error appears in the above-identified patent and that said Letters Patent is hereby corrected as shown below:

Column 1,
Line 10, "or" should read -- for --;
Line 28, "black," should read -- black. --;

Column 2,
Line 64, "mace" should read -- made --;

Column 3,
Line 45, "microcharnels" should read -- microchannels --;

Column 6,
Line 62, "impregnation" should read -- Impregnation --;

Column 7,
Line 17, "22 s preferably" should read -- 22 is preferably --;
Line 42, "DVF" should read -- PVF --; and Column 11,
Line 13, "$2Na^+ + 2e^- + 2H_2O \rightarrow 2NaOH + H_2 \rightarrow$" should read
-- $2Na^+ + 2e^- + 2H_2O \rightarrow 2NaOH + H_2 \nearrow$ --.

Signed and Sealed this

Sixth Day of July, 2004

JON W. DUDAS
*Acting Director of the United States Patent and Trademark Office*